(12) United States Patent
Lee et al.

(10) Patent No.: US 12,397,316 B2
(45) Date of Patent: Aug. 26, 2025

(54) MULTI-SLOT DIE COATER

(71) Applicant: LG Energy Solution, Ltd., Seoul (KR)

(72) Inventors: Taek-Soo Lee, Daejeon (KR);
Min-Kyu Kang, Daejeon (KR);
Shin-Wook Jeon, Daejeon (KR);
Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 263 days.

(21) Appl. No.: 17/910,611

(22) PCT Filed: Aug. 25, 2021

(86) PCT No.: PCT/KR2021/011400
§ 371 (c)(1),
(2) Date: Sep. 9, 2022

(87) PCT Pub. No.: WO2022/065711
PCT Pub. Date: Mar. 31, 2022

(65) Prior Publication Data
US 2023/0133585 A1 May 4, 2023

(30) Foreign Application Priority Data
Sep. 25, 2020 (KR) .................. 10-2020-0125182

(51) Int. Cl.
*B05C 5/02* (2006.01)
*B05C 9/06* (2006.01)
(Continued)

(52) U.S. Cl.
CPC .............. *B05C 5/0254* (2013.01); *B05C 9/06* (2013.01); *B29C 48/305* (2019.02); *B29C 48/313* (2019.02); *H01M 4/0404* (2013.01)

(58) Field of Classification Search
CPC ...... B05C 5/0254; B05C 9/06; H01M 4/0404; B29C 48/305; B29C 48/313
See application file for complete search history.

(56) References Cited

U.S. PATENT DOCUMENTS 5,425,967 A 6/1995 Tomaru
5,871,585 A 2/1999 Most et al.
(Continued)

FOREIGN PATENT DOCUMENTS

CN 206083003 U 4/2017
JP H08323269 A 12/1996
(Continued)

OTHER PUBLICATIONS

Extended European Search Report including Written Opinion for Application No. 21872741.0 dated Oct. 5, 2023, pp. 1-8.
(Continued)

*Primary Examiner* — Jerzi H Moreno Hernandez
(74) *Attorney, Agent, or Firm* — Lerner David LLP

(57) ABSTRACT

A multi-slot die coater includes lower and upper slots; lower, intermediate, and upper die blocks; and first and second manifolds. The first and second manifold are provided in the lower and intermediate die blocks, respectively, to communicate with the respective lower and upper slots. A first bolt is fastened to a contact surface between the upper die block and the intermediate die block, and a distance from an intermediate die lip to one end of the second manifold is A, a distance between one end of the second manifold and the other end is B, and a distance from the other end of the second manifold to an axis of the first bolt is C in an order of how far it is away from the intermediate die lip, C/(A+B+C) is 28% or less.

10 Claims, 4 Drawing Sheets

(51) Int. Cl.
  *B29C 48/305*   (2019.01)
  *B29C 48/31*    (2019.01)
  *H01M 4/04*     (2006.01)

(56)              References Cited

U.S. PATENT DOCUMENTS

| 2001/0002281 | A1  | 5/2001  | Mandai et al. |
| 2002/0023584 | A1* | 2/2002  | Mandai ................... B05C 9/06 |
| 2003/0116881 | A1  | 6/2003  | Nelson et al. |
| 2003/0157252 | A1  | 8/2003  | Tokimasa et al. |
| 2005/0211164 | A1  | 9/2005  | Tokimasa et al. |
| 2006/0269673 | A1* | 11/2006 | Yapel ..................... B29C 48/08 |
|              |     |         | 427/256 |
| 2012/0027942 | A1  | 2/2012  | Joos |
| 2018/0250701 | A1  | 9/2018  | Kuenne |

FOREIGN PATENT DOCUMENTS

| JP | 2006142247  A  | 6/2006  |
| JP |    3899485  B2 | 3/2007  |
| JP | 2007268410  A  | 10/2007 |
| JP |    4358010  B2 | 11/2009 |
| JP | 2020131082  A  | 8/2020  |
| KR | 20040068949 A  | 8/2004  |
| KR | 20070098715 A  | 10/2007 |
| KR |   101488749 B1 | 2/2015  |

OTHER PUBLICATIONS

International Search Report for PCT/KR2021/011400 mailed Dec. 7, 2021. 3 pgs.

* cited by examiner

MULTI-SLOT DIE COATER

CROSS-REFERENCE TO RELATED APPLICATIONS

The present application is a national phase entry under 35 U.S.C. § 371 of International Application No. PCT/KR2021/011400, filed on Aug. 25, 2021, which claims priority to Korean Patent Application No. 10-2020-0125182, filed on Sep. 25, 2020, the disclosures of which are incorporated herein by reference.

TECHNICAL FIELD

The present disclosure relates to a multi-slot die coater capable of simultaneously forming two or more layers by wetting, and more particularly, to a multi-slot die coater with suppressed deformation and twist which are induced by the structural feature due to including a thin die.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator and a negative electrode stacked at least once, and the positive electrode and the negative electrode are manufactured by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

The electrode manufacturing method using the slot die coater includes applying the electrode active material slurry issuing from the slot die coater to the current collector transferred by a coating roll. The conventional slot die coater includes two dies and a slot between the two dies, and may dispense one type of electrode active material slurry through one slot to form a layer of electrode active material.

To manufacture the secondary batteries with high energy density, the thickness of the electrode active material layer which was about 130 μm has gradually increased up to 300 μm. When the thick electrode active material layer is formed by the conventional slot die coater, a binder and a conductive material in the active material slurry migrate fast during drying, and the finally manufactured electrode is not uniform. To solve this problem, when forming the electrode active material layer at a small thickness and drying and repeating this process thereon, it takes a long time to perform coating twice. To improve both electrode performance and productivity, the inventors have proposed a dual slot die coater capable of simultaneously applying two types of electrode active material slurries.

FIG. 1 is a schematic cross-sectional view of the dual slot die coater according to the related art.

Referring to FIG. 1, two electrode active material layers may be simultaneously formed on a current collector 15 by applying two types of electrode active material slurries from the dual slot die coater 20 while rotating a coating roll 10 to move the current collector 15. The electrode active material slurry coming out of the dual slot die coater 20 is applied over one surface of the current collector 15 to form the electrode active material layer.

The dual slot die coater 20 is constructed by assembling three plate members, i.e., three die blocks 21, 22, 23. Slots are formed between the adjacent die blocks, and thus two slots are formed, and the two types of electrode active material slurries are simultaneously dispensed through exit ports 24, 25, each in communication with each slot, so two electrode active material layers may be simultaneously formed by continuously applying an additional electrode active material slurry on the electrode active material layer formed by the previously coated electrode active material slurry. The reference numbers 26, 27 indicate manifolds in which a coating solution is received.

However, due to using the electrode active material slurries simultaneously issuing from the different exit ports 24 and 25, the process using the dual slot die coater 20 is quite difficult to form each electrode active material layer at a desired thickness.

In general, the thickness of each electrode active material layer is affected by the amount of the electrode active material slurry coming out through the exit ports 24, 25, and the amount of the electrode active material slurry coming out is affected by the size of each exit port 24, 25 (slot gap), and thus to form a desired thickness, the conventional art needs to repeat the task of testing the coating process a few times, disassembling and re-assembling the die blocks 21, 22, 23, adjusting the slot gap and checking the amount of the electrode active material slurry coming out. However, the slot gap is a variable that is adjusted so sensitively that the slot gap greatly changes depending on the fastening strength of bolts used to assemble the die blocks 21, 22, 23, and may be changed by a force used to pump the electrode active material slurry. In particular, to stably perform uniform coating in the widthwise direction (TD direction) along the movement direction (MD direction) of the current collector, uniform dimensional precision in the widthwise direction is needed, and it is more difficult to uniformly control the widthwise slot gap as the width of the dual slot die coater 20 increases to use the wide current collector in order to increase the production amount.

Since the slot die coater 20 basically includes three die blocks 21, 22, 23, to configure a device having a foot print and volume similar to the conventional slot die coater including one slot, it is necessary to reduce the thickness of each of the die blocks 21, 22, 23, and by this reason, inevitably, it is structurally vulnerable to deformation and twist. When deformation or twist occurs, the adjusted slot gap is changed, causing defects in the electrode process. Furthermore, this problem will be more serious with a multi-slot die coater including two or more slots due to the increased number of die blocks.

To solve this problem, when each die block 21, 22, 23 increases in size (change in angle), the direction in which the slurry emerges changes, resulting in reduced coating workability. Additionally, among the three die blocks 21, 22, 23, when the die blocks 21, 23 disposed on the outer side increases in thickness to prevent deformation and twist, it is still difficult to prevent deformation of the most structurally vulnerable intermediate die block 22.

Meanwhile, each die block 21, 22, 23 may be assembled by bolt fastening to the contact surface. However, each die block 21, 22, 23 is vulnerable to deformation due to its small thickness, and bolt fastening is prone to cause deformation by the action of a large force, so caution is needed. When movement is made between the die blocks 21, 22, 23 by the force applied when fastening, the movement affects the coating gap, i.e., the distance between the exit ports 24, 25 and the current collector 15, causing loading deviation, resulting in ununiform coating.

DISCLOSURE

Technical Problem

The present disclosure is designed to solve the above-described problem, and therefore the present disclosure is directed to providing a multi-slot die coater with reduced structural vulnerability to deformation and twist in the multi-slot die coater basically including three die blocks.

However, the technical problems to be solved by the present disclosure are not limited to the above problems, and other problems that are not mentioned will be clearly understood by those skilled in the art from the description of the invention described below.

Technical Solution

To solve the above-described technical problem, a multi-slot die coater of the present disclosure is a multi-slot die coater including a lower slot and an upper slot to extrude and coat a coating solution on a surface of a continuously moving substrate through at least one of the lower slot or the upper slot, and the multi-slot die coater includes a lower die block, an intermediate die block positioned on the lower die block such that the lower slot is formed between the intermediate die block and the lower die block, and an upper die block positioned on the intermediate die block such that the upper slot is formed between the upper die block and the intermediate die block; a first manifold provided in the lower die block, the first manifold in which a first coating solution is received, the first manifold being in communication with the lower slot, and a second manifold provided in the intermediate die block, the second manifold in which a second coating solution is received, the second manifold being in communication with the upper slot; and a first bolt fastened to a contact surface between the upper die block and the intermediate die block, wherein the lower die block, the intermediate die block and the upper die block include a lower die lip, an intermediate die lip and an upper die lip that form front ends thereof, respectively, and when a distance from the intermediate die lip to one end of the second manifold is A, a distance between one end of the second manifold and the other end is B, and a distance from the other end of the second manifold to an axis of the first bolt is C in an order of how far it is away from the intermediate die lip, C/(A+B+C) is 28% or less.

The first bolt may be vertically fastened to the contact surface between the upper die block and the intermediate die block.

The vertical range may be an angle range of 90±10° from the contact surface.

The contact surface between the intermediate die block and the upper die block may be parallel to a horizontal plane.

The lower slot and the upper slot may form an angle of 30° to 60°.

In the present disclosure, the multi-slot die coater may further include a second bolt fastened to the contact surface between the intermediate die block and the lower die block, wherein when a distance from the lower die lip to one end of the first manifold is A', a distance between one end of the first manifold and the other end is B', and a distance from the other end of the first manifold to an axis of the second bolt is C' in an order of how far it is away from the lower die lip, C'/(A'+B'+C') is 28% or less.

The second bolt may be vertically fastened to the contact surface between the intermediate die block and the lower die block.

The contact surface between the lower die block and the intermediate die block may be inclined with respect to a horizontal plane.

A lower exit port may be formed between the lower die lip and the intermediate die lip and may be in communication with the lower slot, an upper exit port may be formed between the intermediate die lip and the upper die lip and may be in communication with the upper slot, and a bolt head of the second bolt may be farther away from the lower exit port and the upper exit port than a bolt head of the first bolt.

Advantageous Effects

It is possible to minimize deformation of the die blocks by positioning the bolts according to the present disclosure. Thus, it is possible to reduce a change in coating gap when mounting the multi-slot die coater by assembling the die blocks. It is also possible to suppress slot gap deviation. Accordingly, according to the present disclosure, it is possible to ensure widthwise loading uniformity, thereby improving the coating quality.

According to the present disclosure, it is possible to reduce the structural vulnerability of the die block to deformation or twist, and thereby uniformly form the coating layer, especially, the electrode active material layer, at a desired thickness, and it is possible to coat at least two types of electrode active material slurries at the same time, thereby achieving high performance and productivity. It is possible to prevent deformation when fastening the die blocks, thereby ensuring coating workability and reproducibility. When the multi-slot die coater of the present disclosure is used to coat an electrode active material slurry on a current collector in the manufacture of an electrode of a secondary battery, it is possible to achieve uniform coating under high-speed or wide-scale coating conditions.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawing.

BEST MODE

Figure 1:
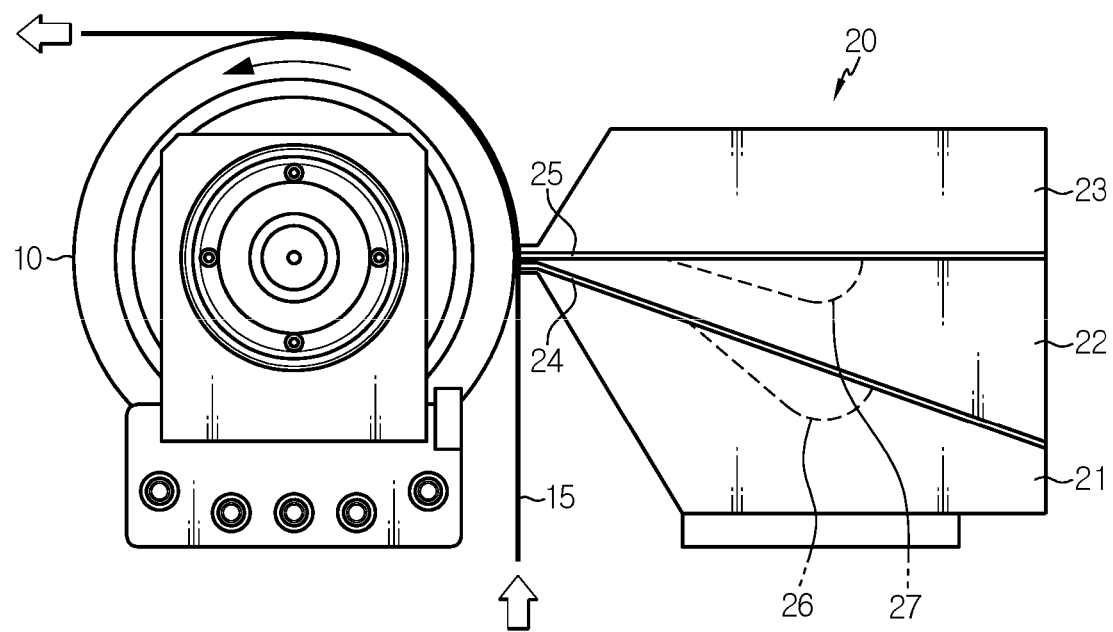
FIG. 1 is a schematic cross-sectional view of a dual slot die coater according to the related art.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A multi-slot die coater of the present disclosure may include two or more slots. Basically, the multi-slot die coater is an apparatus including a lower slot and an upper slot to coat a coating solution in a double layer on a substrate. The 'substrate' described below is a current collector and the coating solution is an 'electrode active material slurry'. Both a first coating solution and a second coating solution are electrode active material slurries, and they may have the same or different compositions (types of an active material, a conductive material and a binder), amounts (amounts of the active material, the conductive material and the binder) or properties. The multi-slot die coater of the present disclosure is optimized for electrodes manufactured by applying at least two types of electrode active material slurries at the same time or by pattern coating of applying at least two types of electrode active material slurries in an alternating manner. However, the scope of the present disclosure is not necessarily limited thereto. For example, the substrate may be a porous support for a separator, and the first coating solution and the second coating solution may be organics having different compositions or properties. That is, in case that thin film coating is required, the substrate, the first coating solution and the second coating solution are not limited to particular types.

The inventors found that the die blocks are deformed by the position of bolts used to fasten the die blocks, and arrived at the present disclosure. Since the die blocks are deformed by the bolt position, the inventors propose the present disclosure based on the idea that to prevent a change in slot gap, bolt positioning is important. The present disclosure proposes the position of bolts used to fasten the die blocks to minimize the loading deviation.

Figure 2:
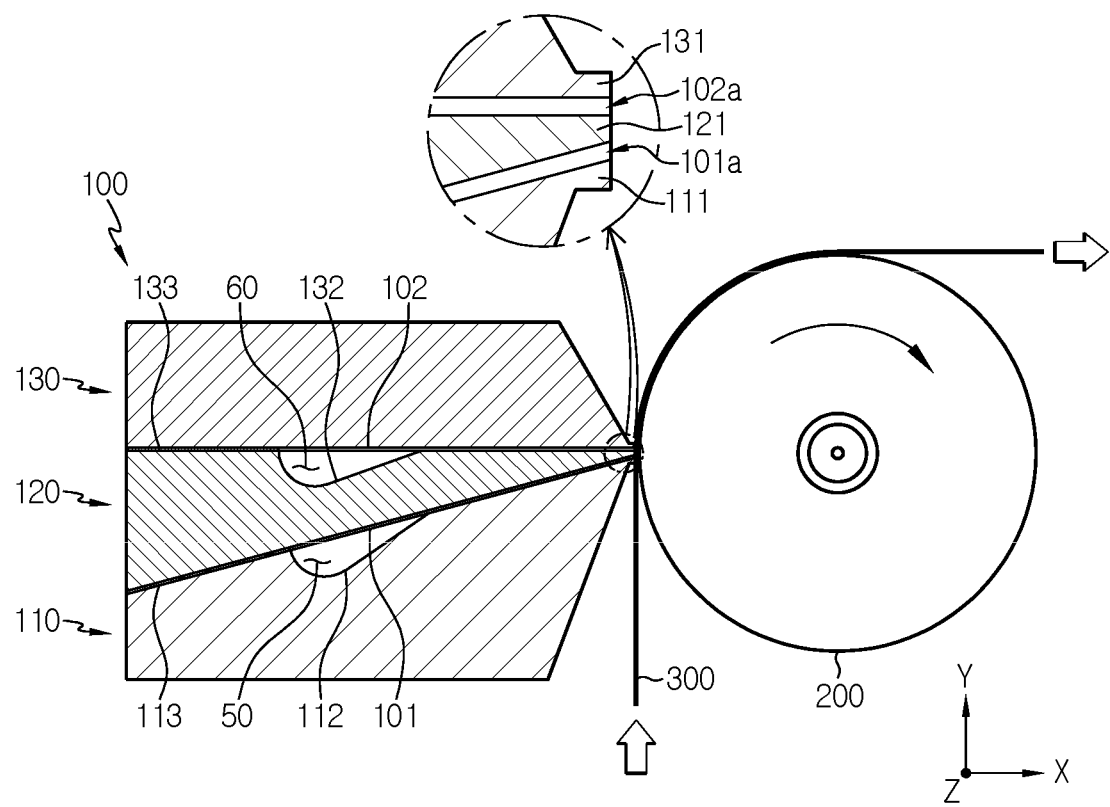
FIG. 2 is a schematic cross-sectional view of a multi-slot die coater according to an embodiment of the present disclosure.
Figure 3:
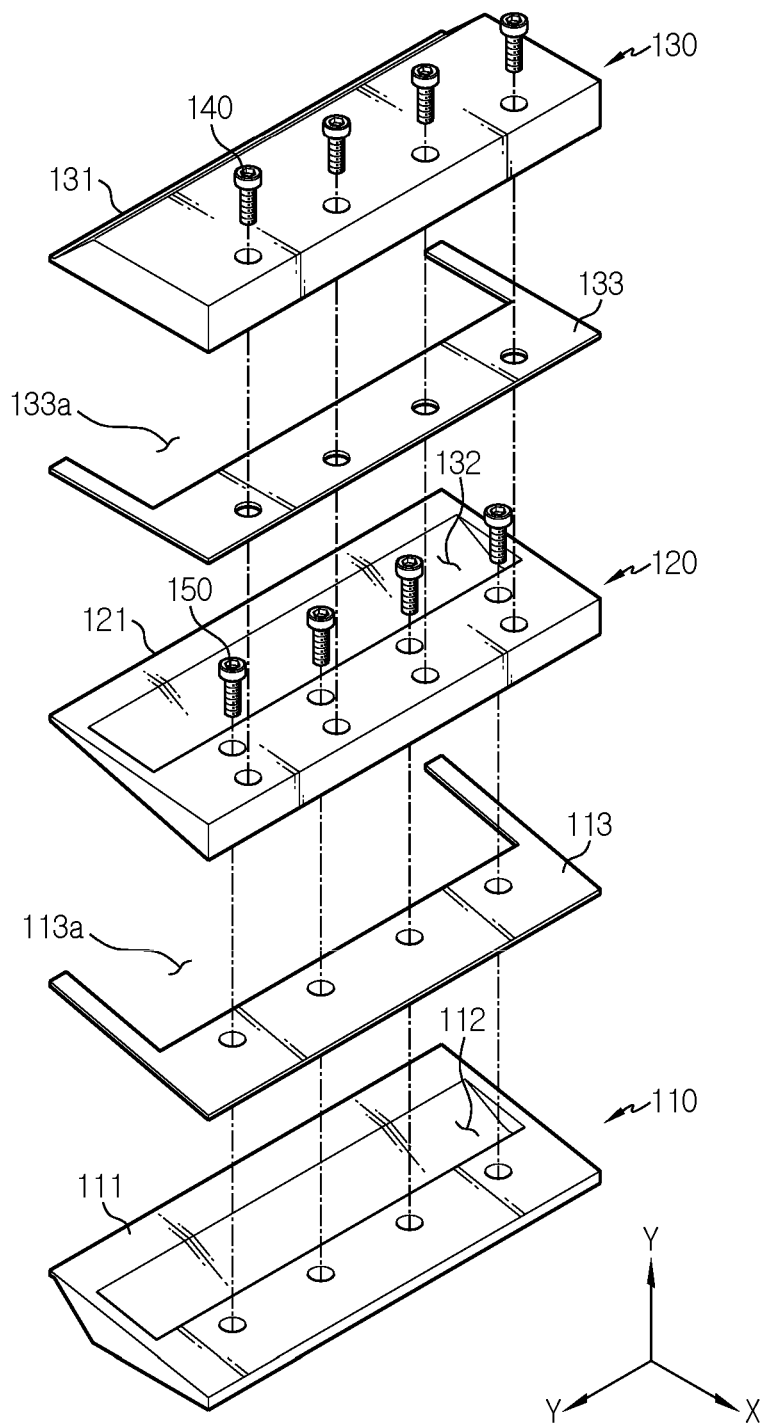
FIG. 3 is a schematic exploded perspective view of a multi-slot die coater according to an embodiment of the present disclosure.

FIG. 2 is a schematic cross-sectional view of the multi-slot die coater according to an embodiment of the present disclosure. FIG. 3 is a schematic exploded perspective view of the multi-slot die coater according to an embodiment of the present disclosure.

The multi-slot die coater 100 according to the present disclosure is a dual slot die coater including a lower slot 101 and an upper slot 102, and is an apparatus capable of simultaneously or alternately coating a same type of coating solution or two different types of coating solutions on a substrate 300 through the lower slot 101 and the upper slot 102. Referring to FIGS. 2 and 3, the multi-slot die coater 100 includes a lower die block 110, an intermediate die block 120 positioned on the lower die block 110, and an upper die block 130 positioned on the intermediate die block 120. The die blocks 110, 120, 130 are assembled with one another though a first bolt 140 and a second bolt 150.

The lower die block 110 is the lowermost block among the blocks of the multi-slot die coater 100, and the surface facing the intermediate die block 120 is inclined at an angle of approximately 30° to 60° to the bottom surface (X-Z plane). The intermediate die block 120 is positioned in contact with the upper surface of the lower die block 110 inclined with respect to the horizontal plane. The lower slot 101 is formed at a location in which the intermediate die block 120 and the lower die block 110 are in contact with each other.

For example, a first spacer 113 is interposed between the lower die block 110 and the intermediate die block 120 to form a gap between, and the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 3, the first spacer 113 has a first opening portion 113a which is cut at an area, and may be interposed in the remaining portion except one side in the edge area of the facing surface of each of the lower die block 110 and the intermediate die block 120. Accordingly, a lower exit port 101a through which the first coating solution 50 emerges is only formed between the front end of the lower die block 110 and the front end of the intermediate die block 120. The front end of the lower die block 110 and the front end of the intermediate die block 120 are defined as a lower die lip 111 and an intermediate die lip 121, respectively, and in other words, the lower exit port 101a is formed by the spacing between the lower die lip 111 and the intermediate die lip 121.

For reference, the first spacer 113 acts as a gasket to prevent the leakage of the first coating solution 50 through the gap between the lower die block 110 and the intermediate die block 120 except the area where the lower exit port 101a is formed, and thus the first spacer 113 is preferably made of a material having sealing ability.

The lower die block 110 includes a first manifold 112 having a predetermined depth on the surface facing the intermediate die block 120, and the first manifold 112 is in communication with the lower slot 101. Although not shown in the drawings, the first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The intermediate die block 120 is a block in the middle of the blocks of the multi-slot die coater 100, and is a block interposed between the lower die block 110 and the upper die block 130 to form a dual slot. The intermediate die block 120 of this embodiment is a right-angled triangle in cross section. According to another embodiment, the intermediate die block 120 may be, for example, an isosceles triangle in cross section.

The upper die block 130 is positioned in contact with the upper surface of the intermediate die block 120 parallel to the bottom surface. The upper slot 102 is formed at a location in which the intermediate die block 120 and the upper die block 130 are in contact with each other.

In the same way as the lower slot 101 described above, a second spacer 133 may be interposed between the intermediate die block 120 and the upper die block 130 to form a gap between. Accordingly, the upper slot 102 corresponding to a passage through which a second coating solution 60 may flow is formed. In this case, the vertical width (Y-axis direction, the slot gap) of the upper slot 102 is determined by the second spacer 133.

In addition, the second spacer 133 having the similar structure to the first spacer 113 has a second opening portion 133a which is cut at an area, and is interposed in the remaining portion except one side in the edge area of the facing surface of each of the intermediate die block 120 and the upper die block 130. Likewise, the circumferential direction except the front side of the upper slot 102 is blocked, and the upper exit port 102a is only formed between the front end of the intermediate die block 120 and the front end of the upper die block 130. The front end of the upper die block 130 is defined as an upper die lip 131, and in other words, the upper exit port 102a is formed by the spacing between the intermediate die lip 121 and the upper die lip 131.

In addition, the intermediate die block 120 includes a second manifold 132 having a predetermined depth on the surface facing the intermediate die block 120, and the second manifold 132 is in communication with the upper slot 102. Although not shown in the drawings, the second manifold 132 is connected to a second coating solution supply chamber installed outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 30° to 60°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

In this embodiment, the first manifold 112 is formed in the lower die block 110, and the second manifold 132 is formed in the intermediate die block 120. The first manifold 112 may be formed in the intermediate die block 120, and the second manifold 132 may be formed in the upper die block 130.

According to the multi-slot die coater 100 having such a configuration, a rotatable coating roll 200 is positioned in front of the multi-slot die coater 100, and the coating roll 200 may be rotated to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

The multi-slot die coater 100 extrudes and coats the coating solution on the surface of the continuously moving substrate 300 through at least one of the lower slot 101 or the upper slot 102. In this embodiment, the contact surface between the intermediate die block 120 and the upper die block 130 is parallel to the horizontal plane. The first bolt 140 is fastened to the contact surface. Additionally, the contact surface between the intermediate die block 120 and the lower die block 110 is inclined with respect to the horizontal plane. The second bolt 150 is fastened to the contact surface. There may be at least one first bolt 140 and at least one second bolt 150. FIG. 3 shows an example in which the first bolt 140 is inserted in the downward direction from the rear surface of the upper die block 130, and a plurality of first bolts 140 is fastened along the widthwise direction of the upper die block 130. The second bolt 150 or the first bolt 140 is characterized in having the following positions. It will be described in detail.

Figure 4:
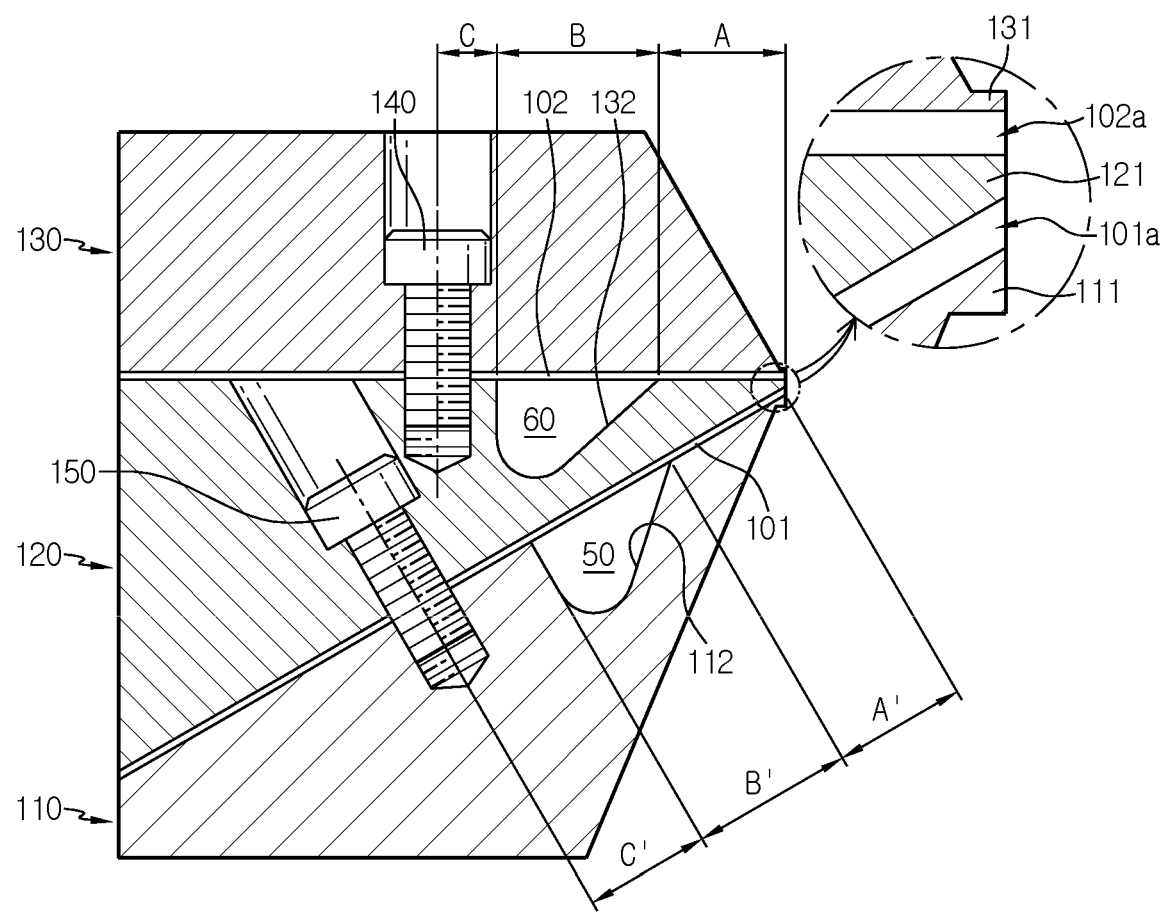
FIG. 4 is a cross-sectional view showing bolt fastening between die blocks in a multi-slot die coater according to an embodiment of the present disclosure.

FIG. 4 is a cross-sectional view showing the bolt fastening between the die blocks in the multi-slot die coater according to an embodiment of the present disclosure.

In the order of how far it is away from the intermediate die lip 121, when the distance from the intermediate die lip 121 to one end of the second manifold 132 is A, the distance between one end of the second manifold 132 and the other end is B, and the distance from the other end of the second manifold 132 to the axis of the first bolt 140 is C, C/(A+B+C) is 28% or less.

Here, an area from the intermediate die lip 121 to one end of the second manifold 132 is referred to as land. The area between one end of the second manifold 132 and the other end corresponds to the size when viewed from the second manifold 132. The second coating solution 60 fully filled in the second manifold 132 flows from the second manifold 132 via the upper slot 102 and is coated on the substrate 300 through the upper exit port 102a. Accordingly, the second coating solution 60 is present from the other end of the second manifold 132 to the intermediate die lip 121. Additionally, the length of the area in which the second coating solution 60 exists is A+B. The distance C from the other end of the second manifold 132 to the axis of the first bolt 140 defines the fastening position of the first bolt 140.

When the first bolt 140 is too close to the intermediate die lip 121, a slurry coating area (an area in which the second coating solution 60 exists, an area from the second manifold 132 to the upper exit port 102a, its length is A+B) reduces and the loading deviation increases. When the first bolt 140 is too far away from the intermediate die lip 121, deformation occurs in the opposite slot gap by the adverse effect of the first bolt 140 tightening (leverage effect), causing greater loading deviation. Accordingly, it is necessary to fasten the first bolt 140 to an appropriate position from the intermediate die lip 121. The present disclosure proposes a new parameter C/(A+B+C) of 28% or less in setting the appropriate fastening position. When A, B, C have this relationship, it is possible to minimize the loading deviation. C/(A+B+C) is 28% or less. The upper limit is important, and the lower limit does not matter. When C/(A+B+C) is more than 28%, deformation occurs in the opposite slot gap by the adverse effect of the first bolt 140 tightening, causing greater loading deviation, and accordingly, C/(A+B+C) is 28% or less. As the first bolt 140 is closer to the other end of the second manifold 132, C gets close to 0. However, since the first bolt 140 is not fastened into the second manifold 132 (leakage), C is larger than 0. A and B are determined by the design of the intermediate die block 120 and the second manifold 132.

The first bolt 140 may be vertically fastened to the contact surface between the upper die block 130 and the intermediate die block 120. The vertical range may be an angle range of 90±10° from the contact surface.

The fastening position of the second bolt 150 may be the same as the fastening position setting of the first bolt 140 as described above. That is, in the order of how far it is away from the lower die lip 111, when the distance from the lower die lip 111 to one end of the first manifold 112 is A', the distance between one end of the first manifold 112 and the other end is B', and the distance from the other end of the first manifold 112 to the axis of the second bolt 150 is C', C'/(A'+B'+C') is 28% or less. When A', B', C' have this relationship, it is possible to minimize the loading deviation by the above-described reason.

Meanwhile, the bolt head of the second bolt 150 may be farther away from the lower exit port 101a and the upper exit port 102a than the bolt head of the first bolt 140. By this configuration, it is possible to prevent deformation of the die blocks 110, 120, 130 through uniform distribution of the fastening force without interference between the first bolt 140 and the second bolt 150 while not affecting the first manifold 112 and the second manifold 132.

The second bolt 150 may be vertically fastened to the contact surface between the intermediate die block 120 and the lower die block 110. The vertical range may be an angle range of 90±10° from the contact surface.

When the second bolt 150 is fastened, at an angle, not vertically, to the inclined contact surface between the intermediate die block 120 and the lower die block 110, forces by the second bolt 150 tightening are split into force perpendicular to the contact surface and force parallel to the contact surface. Thus, when fastening, the intermediate die block 120 will slip by the force parallel to the contact surface. When movement is made between the die blocks 110, 120, 130 by the force applied when fastening, the movement affects the coating gap, i.e. the distance between the lower and upper exit ports 101a, 102a and the substrate 300, causing ununiform coating. Accordingly, it is desirable to vertically fasten the second bolt 150 to the inclined contact surface. When the second bolt 150 is vertically fastened to the inclined contact surface, the direction of the force when fastening the second bolt 150 is perpendicular to the inclined contact surface and slip does not occur. Accordingly, in the second bolt 150 which does not simply fix, and applies the fastening torque, the tightening force of the second bolt 150 prevents the slip of the intermediate die block 120 on the upper die block 110. Accordingly, it is possible to reduce a change in coating gap when mounting the multi-slot die coater 100 by assembling the die blocks 110, 120, 130.

As described above, according to the present disclosure, it is possible to minimize deformation of the die blocks 110, 120, 130 and ensure widthwise loading uniformity, thereby improving the coating quality. Additionally, according to the present disclosure, it is possible to suppress the slot gap deviation.

Although this embodiment describes applying the coating solution in two layers or performing pattern coating by supplying the coating solution in an alternating manner, it is obvious that the present disclosure may be applied to mixing two types of coating solutions in the middle of the slot, not dispensing through individual slots, or simultaneous coating of three or more layers using three or more slots. It is obvious that four or more die blocks are needed for three or more slots.

Hereinafter, an example of demonstrating the effect of the present disclosure through the simulation results will be described. The internal flow simulation of the multi-slot die coater is carried out.

The loading deviation refers to flow rate deviation at the end of the die lip (maximum value (MAX) of flow rate-minimum value (MIN) of flow rate). For uniform coating quality, it is necessary to control the loading deviation below 10%. The loading deviation simulation is carried out by variously combining A, B, C. The current simulation technology is excluded since it is difficult to accurately interpret the external flow. Since the influence of the external flow of the die blocks may be reflected, there may be a slight difference from the loading deviation in the actual multi-slot die coater.

Table 1 summarizes A, B, C conditions of example and comparative example and their loading deviation.

TABLE 1

| | A | B | C | C/(A + B) | C/(A + B + C) | Loading deviation (MAX-MIN)% |
|---|---|---|---|---|---|---|
| Example 1 | 50 | 50 | 17 | 17.00% | 14.53% | 2.3 |
| Example 2 | 50 | 50 | 20 | 20.00% | 16.67% | 2.6 |
| Example 3 | 50 | 50 | 30 | 30.00% | 23.08% | 4.8 |
| Comparative example 1 | 50 | 50 | 40 | 40.00% | 28.57% | 11 |
| Comparative example 2 | 50 | 50 | 50 | 50.00% | 33.33% | 15 |
| Comparative example 3 | 50 | 50 | 60 | 60.00% | 37.50% | 21 |

In example and comparative example, A and B are 50 (unit: a.u), and C of example increases to 17, 20, 30. C of comparative example increases to 40, 50, 60. C increases as it goes from example 1 to comparative example 3. The calculation results of C/(A+B+C) are: 14.53% in example 1, 16.67% in example 2, 23.08% in example 3, 28.57% in comparative example 1, 33.33% in comparative example 2, and 37.50% in comparative example 3. Since A, B are fixed and C increases, C/(A+B+C) increases. As a result of calculating the loading deviation in each case, the loading deviation of example is 2.3 to 4.8% which satisfy the management range of less than 10%. In contrast, the loading deviation of comparative example is calculated as 11 to 21%, and thus is evaluated as a level exceeding the current management range of 10%.

In particular, from the findings that when C/(A+B+C) of comparative example 1 is 28.57%, the loading deviation is 11%, it is concluded that C/(A+B+C) satisfying the loading deviation of less than 10% is 28% or less. C/(A+B+C) is a new parameter that has never been considered, and it has a significance as a new parameter introduced to minimize the loading deviation, and at the present time, for the loading deviation of less than 10%.

According to the present disclosure, it is possible to prevent deformation or twist of the die block having structural vulnerability, and thereby uniformly form the coating layer, in particular, the electrode active material layer at a desired thickness, and it is possible to coat two types of electrode active material slurries at the same time, thereby achieving high performance and productivity. It is possible to prevent slip when fastening the die blocks, thereby ensuring coating workability and reproducibility. When the multi-slot die coater of the present disclosure is used to coat an electrode active material slurry on a current collector in the manufacture of an electrode of a secondary battery, it is possible to achieve uniform coating under high-speed or wide-scale coating conditions.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

What is claimed is:
1. A multi-slot die coater comprising:
a lower slot and an upper slot,
a lower die block, an intermediate die block positioned on the lower die block such that the lower slot is formed between the intermediate die block and the lower die block, and an upper die block positioned on the inter- mediate die block such that the upper slot is formed between the upper die block and the intermediate die block;

a first manifold provided in the lower die block, the first manifold in which a first coating solution is received, the first manifold being in communication with the lower slot, and a second manifold provided in the intermediate die block, the second manifold in which a second coating solution is received, the second manifold being in communication with the upper slot; and a first bolt fastened to a contact surface between the upper die block and the intermediate die block, wherein the lower die block, the intermediate die block and the upper die block include a lower die lip, an intermediate die lip and an upper die lip that form front ends thereof, respectively, and wherein when a distance from the intermediate die lip to one end of the second manifold is A, a distance between one end of the second manifold and the other end is B, and a distance from the other end of the second manifold to an axis of the first bolt is C in an order of how far it is away from the intermediate die lip, $C/(A+B+C)$ is 0.28 or less, wherein the front end of the lower die lip, the intermediate die lip, and the upper die lip are parallel to a vertical plane of a discharge end of the multi-slot die coater.

2. The multi-slot die coater according to claim 1, wherein the first bolt is vertically fastened to the contact surface between the upper die block and the intermediate die block.

3. The multi-slot die coater according to claim 2, wherein a vertical range is an angle range of 90±10° from the contact surface.

4. The multi-slot die coater according to claim 1, wherein the contact surface between the intermediate die block and the upper die block is parallel to a horizontal plane.

5. The multi-slot die coater according to claim 1, wherein the lower slot and the upper slot form an angle of 30° to 60°.

6. The multi-slot die coater according to claim 1, further comprising:

a second bolt fastened to the contact surface between the intermediate die block and the lower die block, wherein when a distance from the lower die lip to one end of the first manifold is A', a distance between one end of the first manifold and the other end is B', and a distance from the other end of the first manifold to an axis of the second bolt is C' in an order of how far it is away from the lower die lip, $C'/(A'+B'+C')$ is 0.28 or less.

7. The multi-slot die coater according to claim 6, wherein the second bolt is vertically fastened to the contact surface between the intermediate die block and the lower die block.

8. The multi-slot die coater according to claim 7, wherein a vertical range is an angle range of 90±10° from the contact surface.

9. The multi-slot die coater according to claim 7, wherein the contact surface between the lower die block and the intermediate die block is inclined with respect to a horizontal plane.

10. The multi-slot die coater according to claim 7, wherein a lower exit port is formed between the lower die lip and the intermediate die lip and is in communication with the lower slot, an upper exit port is formed between the intermediate die lip and the upper die lip and is in communication with the upper slot, and a bolt head of the second bolt is farther away from the lower exit port and the upper exit port than a bolt head of the first bolt.

* * * * *